March 28, 1939. G. J. ROOT ET AL 2,152,569

BLOCK PRESS

Filed Dec. 24, 1934 6 Sheets-Sheet 1

INVENTORS
GEORGE J. ROOT
AND ARTHUR H. McCALL
BY
ATTORNEY.

March 28, 1939.  G. J. ROOT ET AL  2,152,569
BLOCK PRESS
Filed Dec. 24, 1934   6 Sheets-Sheet 2

INVENTORS
GEORGE J. ROOT
AND ARTHUR H. McCALL
BY
ATTORNEY.

March 28, 1939. G. J. ROOT ET AL 2,152,569
BLOCK PRESS
Filed Dec. 24, 1934 6 Sheets-Sheet 3

INVENTORS
GEORGE J. ROOT
AND ARTHUR H. McCALL
BY
ATTORNEY.

March 28, 1939.  G. J. ROOT ET AL  2,152,569
BLOCK PRESS
Filed Dec. 24, 1934  6 Sheets-Sheet 4

INVENTORS
GEORGE J. ROOT
AND ARTHUR H. McCALL
BY
ATTORNEY.

March 28, 1939. G. J. ROOT ET AL 2,152,569
BLOCK PRESS
Filed Dec. 24, 1934 6 Sheets-Sheet 5

INVENTORS
GEORGE J. ROOT
AND ARTHUR H. McCALL
BY
ATTORNEY.

March 28, 1939. G. J. ROOT ET AL 2,152,569
BLOCK PRESS
Filed Dec. 24, 1934 6 Sheets-Sheet 6

INVENTORS
GEORGE J. ROOT
AND ARTHUR H. McCALL
BY
ATTORNEY.

Patented Mar. 28, 1939

2,152,569

UNITED STATES PATENT OFFICE 2,152,569

BLOCK PRESS

George J. Root and Arthur H. McCall, Elmira, N. Y.; said McCall assignor to said Root Application December 24, 1934, Serial No. 758,971

12 Claims. (Cl. 25—45)

The invention relates to improvements in block presses and more particularly to presses employed in the manufacture of blocks employing Portland cement, or the like, as a binder.

The object of this invention is an improved product of uniform external dimension throughout its entire depth.

Another object is to obtain the effect of a trowelled external surface on the product.

Still another object is to obtain uniform density of the product throughout its entire mass.

A further object is to permit the manufacture of blocks the density of which may be varied and controlled at the will of the operator.

A still further object is to facilitate the interchange of the cores and mold so as to permit the manufacture of blocks of varying sizes and shapes and to enable the cores and mold to be easily cleaned.

The above and other objects may be accomplished by employing this invention which embodies among its features elevating the mold in which the block has been pressed so as to cause that part of the mold which extends below the level of the pallet to engage the exterior surfaces of the block and serve as a sizing ring so as to thereby insure uniform external dimensions throughout the entire depth of the block.

Another feature of the invention is the employment of a floating mold box and floating cores which may yield during the pressing operation so as to produce in effect a pressing operation at both ends of the block and thus tend to insure uniform density throughout the product.

A further feature is the adjusting of the position of the mold box to permit a greater or lesser fill of aggregate whereby the density of blocks of predetermined uniform size may be made to vary within wide limits under the control of the operator.

Still other features include permitting the cores which are employed when hollow blocks are being produced to be entirely withdrawn so as to permit them and the mold box to be easily cleaned or removed to permit a substitution by which blocks of different sizes and shapes can be produced.

Figure 1:
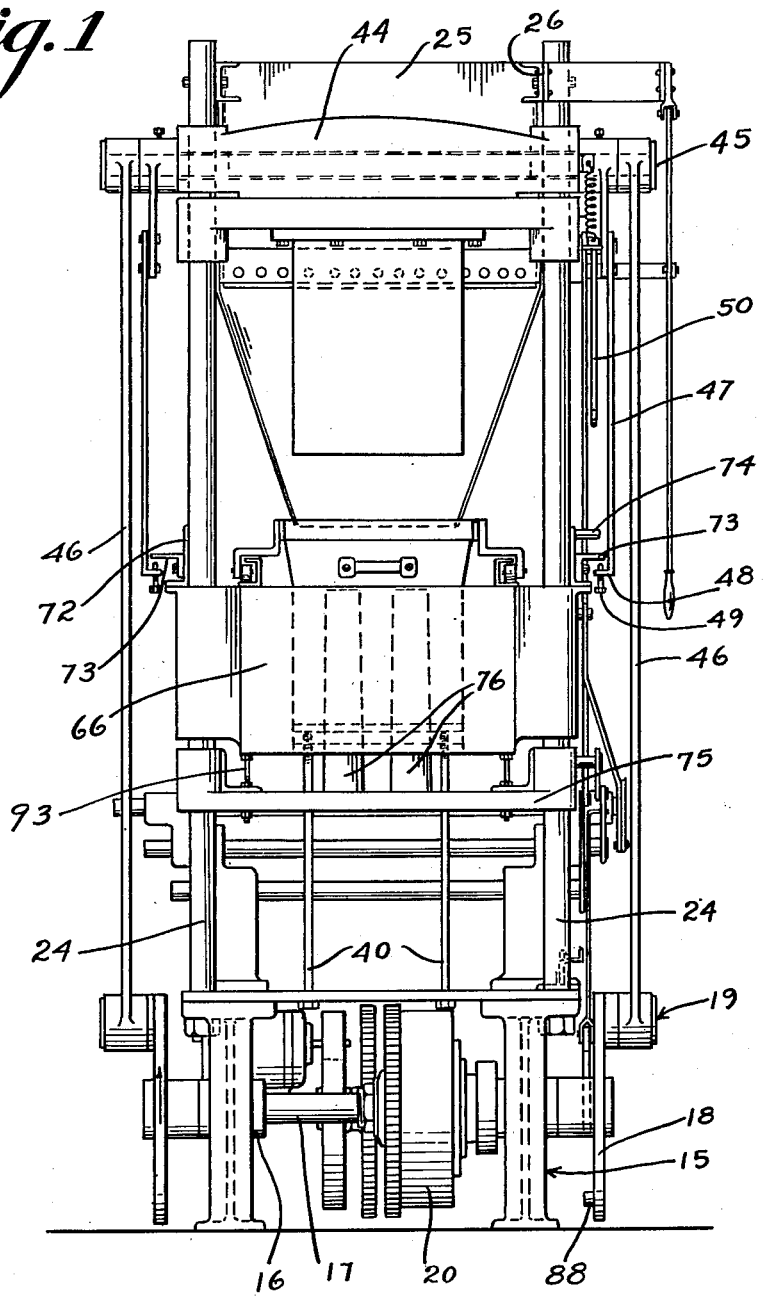
Fig. 1 is a front view of a block press embodying this invention.

Referring to the drawings, the press includes a base designated generally 15 and carries bearings 16 in which a drive shaft 17 is journalled. This shaft extends beyond opposite sides of the base and carries disks 18 which are provided with outwardly extending crank pins designated generally 19. A clutch mechanism 20 is mounted intermediate the ends of the shaft 17 and is connected through a suitable gear train 21 and drive belt 22 with a source of power such as an electric motor 23. Extending upwardly from the base 15 on the opposite sides thereof are pairs of parallel standards 24 the upper ends of which are connected by cross pieces 25 and channel bars 26 which latter extend rearwardly beyond the rearmost standards 24 and form supports for a feed chute 27 the upper end of which is connected with a suitable source of aggregate supply (not shown). Rigidly attached to the chute 27 intermediate its ends are brackets 28 having downwardly extending arms 29 which support at their lower ends a transversely extending roller 30 upon which a boot 31 is slidably mounted. The lower end of this boot is pivoted at 32 to the feed hopper 33 mounted for horizontal sliding movement in tracks 34 which are supported in such position that when the mold box, to be more fully hereinafter described, is in aggregate receiving position (Figs. 1 and 2) the hopper 33 may be moved toward the front of the press so that aggregate flowing from the mouth of the boot 31 will be directed into the mold box.

In order to control the flow of aggregate from the mouth of the chute 27, the front wall of the chute is provided near its lower end with a horizontal row of perforations in which fingers 35 slide. These fingers are supported on a horizontally extending tie bar 36 which extends transversely of the press and is connected by a link 37 to a lever 38 which is pivoted at 39 to the forward end of one of the channels 26 in such a manner that upon moving the lever about its pivot the fingers 35 may be moved into and out of position to stop the flow of the aggregate from the mouth of the chute 27.

Figure 4:
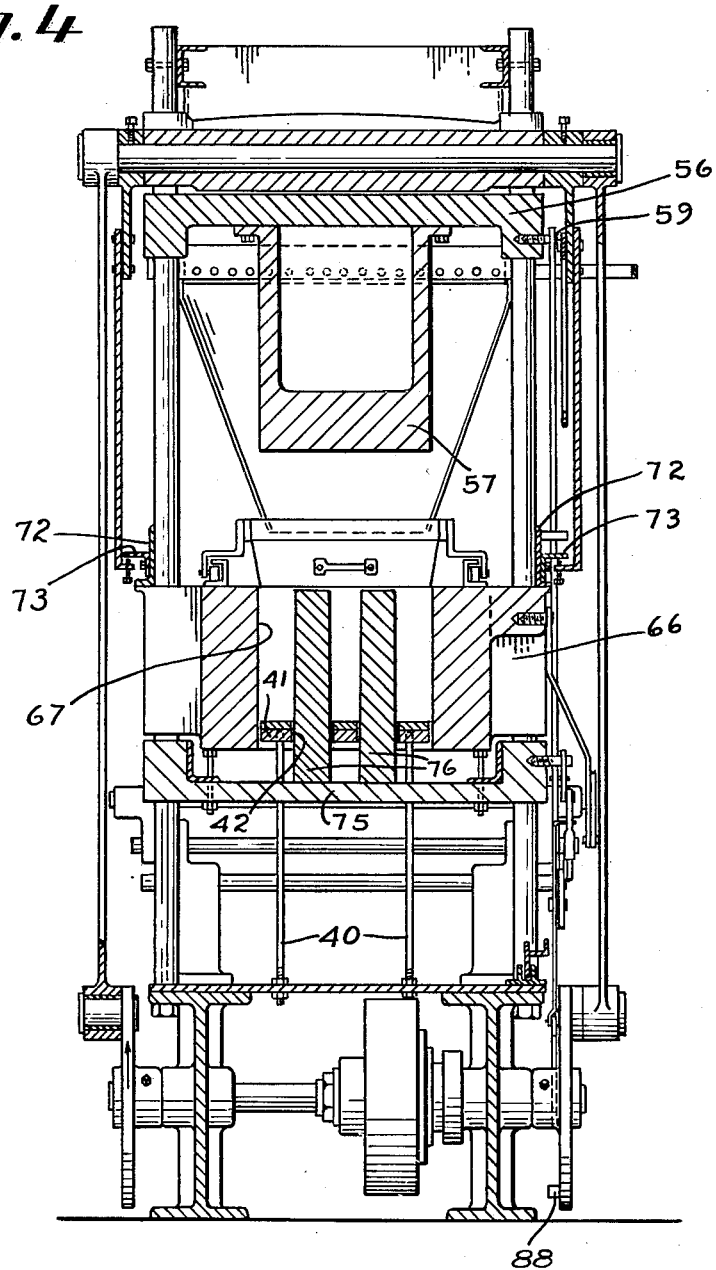
Fig. 4 is a vertical sectional view taken on the line 4—4 of Fig. 2.
Figure 5:
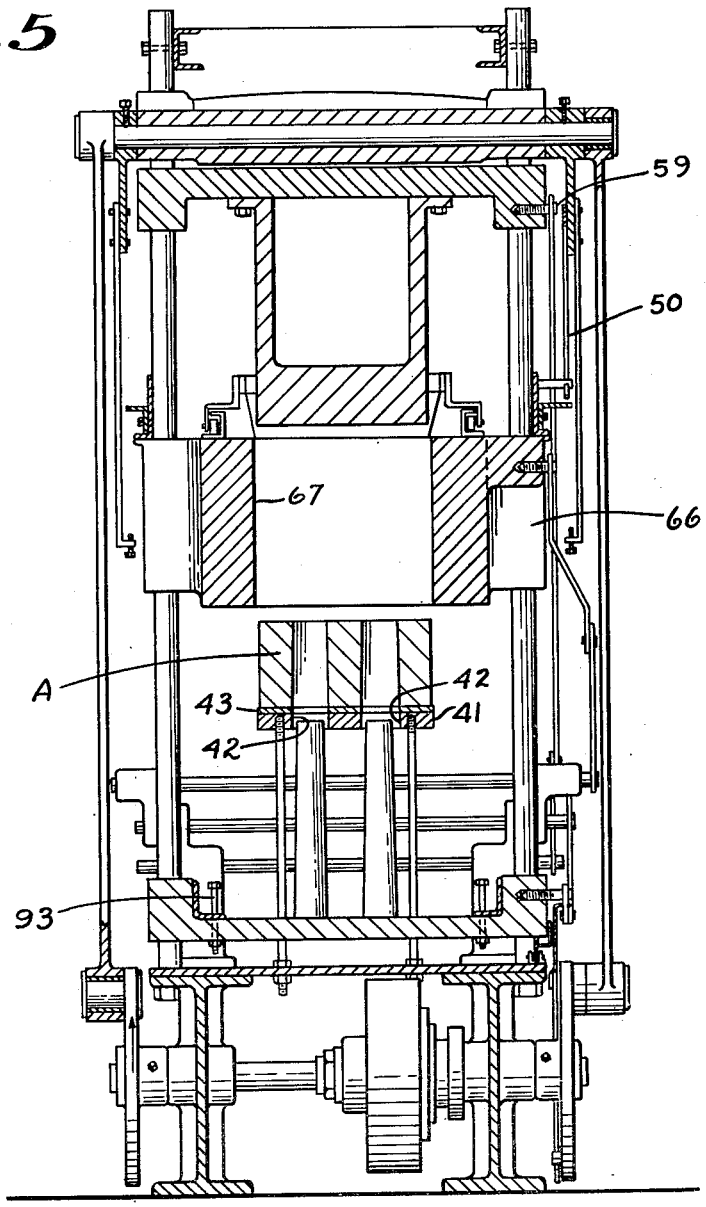
Fig. 5 is a view similar to Fig. 4 showing the parts after the pressing operation has been completed and before the finished block and the pallet have been removed.
Figure 6:
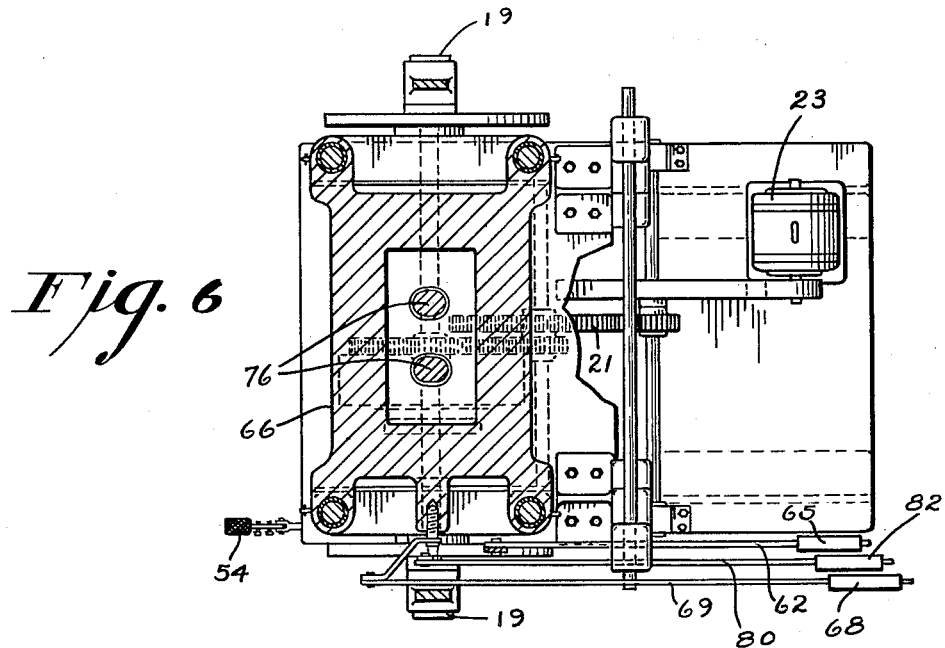
Fig. 6 is a horizontal sectional view taken on the line 6—6 of Fig. 2.

Extending upwardly from the base 15 are pins 40, the upper ends of which are connected to a plate 41 (Figs. 4 and 5) which is perforated at 42 to receive mold cores to be more fully hereinafter described. This plate 41 is thus rigidly supported and serves as a lower press head upon which a block supporting pallet 43 rests.

Mounted for vertical sliding movement on the standards 24 near their upper ends is a power head 44 carrying at opposite ends aligning trunnions 45 to which the upper ends of links 46 are pivoted. The lower ends of the links are connected to the crank pins 19 so that when the shaft 17 rotates the disks 18, the power head will travel downwardly along the standards 24. Rigidly secured to the trunnions 45 adjacent the links 46 are depending arms 47 the lower ends of which are turned inwardly as at 48 and carry set screws 49 for a purpose to be more fully hereinafter described. A downwardly extending hook 50 is pivoted at 51 to one of the depending arms 47 and extending forwardly from the hook is a horizontal arm 52 the forward end of which is pierced to receive a substantially vertical tie rod 53 the lower end of which is pivoted to a treadle 54. The upper end of the rod 53 is provided with a nut 55 forming an adjustable stop for engagement with the arm 52 when the power head 44 is in its elevated position (Figs. 1, 2, 4 and 5).

Slidably mounted on the standards 24 directly beneath the power head 44 is a floating head 56 carrying a depending press head 57 the lower end of which is formed with a block molding face 58 which enters a mold box to compress the aggregate and form a block as will be more fully hereinafter described. Pivoted at 59 to the floating head 56 is the upper end of a link 60 the lower end of which is pivoted at 61 to a lever 62. This lever is in turn pivoted to rotate about the axis of a shaft 63 which is supported in brackets 64 carried by the base 15. Adjustably mounted on the end of the arm 62 is a counterweight 65 which is so adjusted as to cause the head 56 to be yieldingly held against the power head 44.

Figure 2:
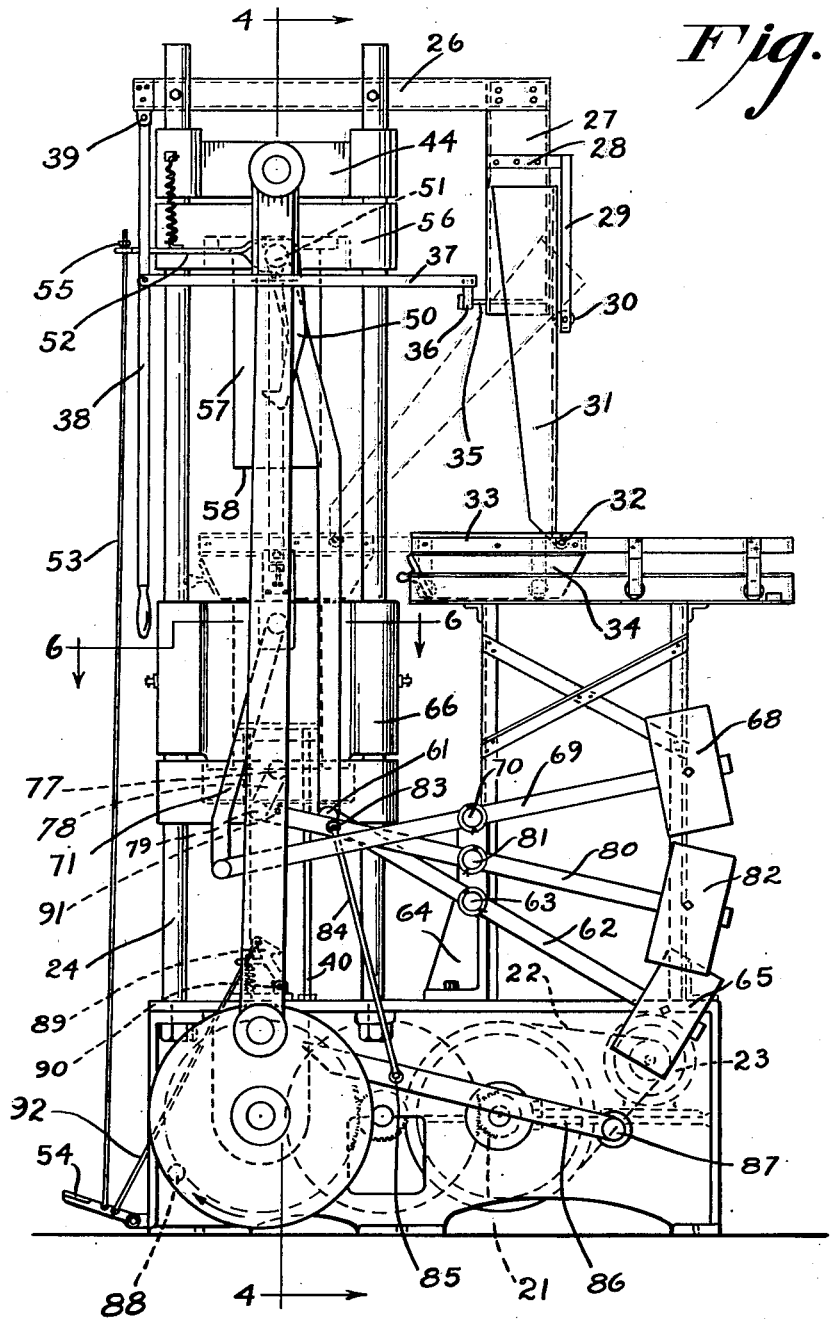
Fig. 2 is a side view in elevation of Fig. 1.

Mounted for vertical sliding movement on the standards 24 intermediate their upper and lower ends is a mold box 66 having an opening 67 which extends vertically throughout its length and in which the aggregate is received and pressed by the press head 57. The mold box is yieldingly supported in aggregate receiving position illustrated in Figs. 1 and 2 by means of a counterweight 68 which is adjustably mounted on a lever 69 which latter is pivoted on a shaft 70 supported in the brackets 64 previously described. The end of the lever 69 opposite that carrying the counterweight 68 is connected by a link 71 to the mold box 66, and by adjusting the weight 68 along the lever 69 the weight of the mold box can be nicely counterbalanced so that it can be made to gently float to its pressing position shown in Figs. 1 to 4, inclusive. Secured to the upper end of the mold box 66 are brackets 72 carrying outwardly extending flanges 73 for engagement with the set screws 49 to limit the downward movement of the mold box when the power head is in elevated position as shown in Figs. 1 and 2. Extending outwardly from one of the brackets 72 and in the path of the hook 50 is a pin 74 the purpose of which will appear as the description proceeds.

Mounted for vertical sliding movement on the standards directly below the mold box 66 is a core bridge 75 upon which mold cores 76 are supported in such position that when the bridge is in its elevated position shown in Figs. 1 to 4, incl., the said mold cores are disposed in spaced relation to and within the walls of the opening 67. Adjustable stop pins 93 are carried by the core bridge 75 and their upper ends engage the under side of the mold box 66 when the core bridge is in its elevated position as shown in Figs. 1 and 2. Pivoted at 77 to the core bridge 75 is the upper end of a link 78 the lower end of which is pivoted at 79 to a lever 80 which is mounted to oscillate about a shaft 81 carried by the brackets 64. A counterweight 82 is adjustably mounted on the end of the lever 80 and serves to yieldingly urge the core bridge and cores upwardly into the position shown in Figs. 1, 2 and 4. Pivoted at 83 to the lever 80 between the pivots 79 and 81 is one end of a link 84 the opposite end of which is pivoted at 85 to an operating lever 86 one end of which is pivoted at 87 to the frame 15. The opposite end of this lever projects beyond the periphery of the disk 18 on the side of the press on which the lever 86 is pivoted and is adapted to be engaged by a lug 88 carried by the disk so that as the latter revolves the lug 88 will force the free end of the lever 86 downwardly and thereby lower the core bridge 75 so as to withdraw the cores 76 from within the mold box 66. In order to hold the core bridge in lowered position a spring pressed latch 89 is pivoted at 90 to the frame 15 in such position as to engage a lug 91 carried by the core bridge 75. Connected to the latch 89 is one end of a tie rod 92 the opposite end of which is connected to the treadle 54 above mentioned.

Figure 3:
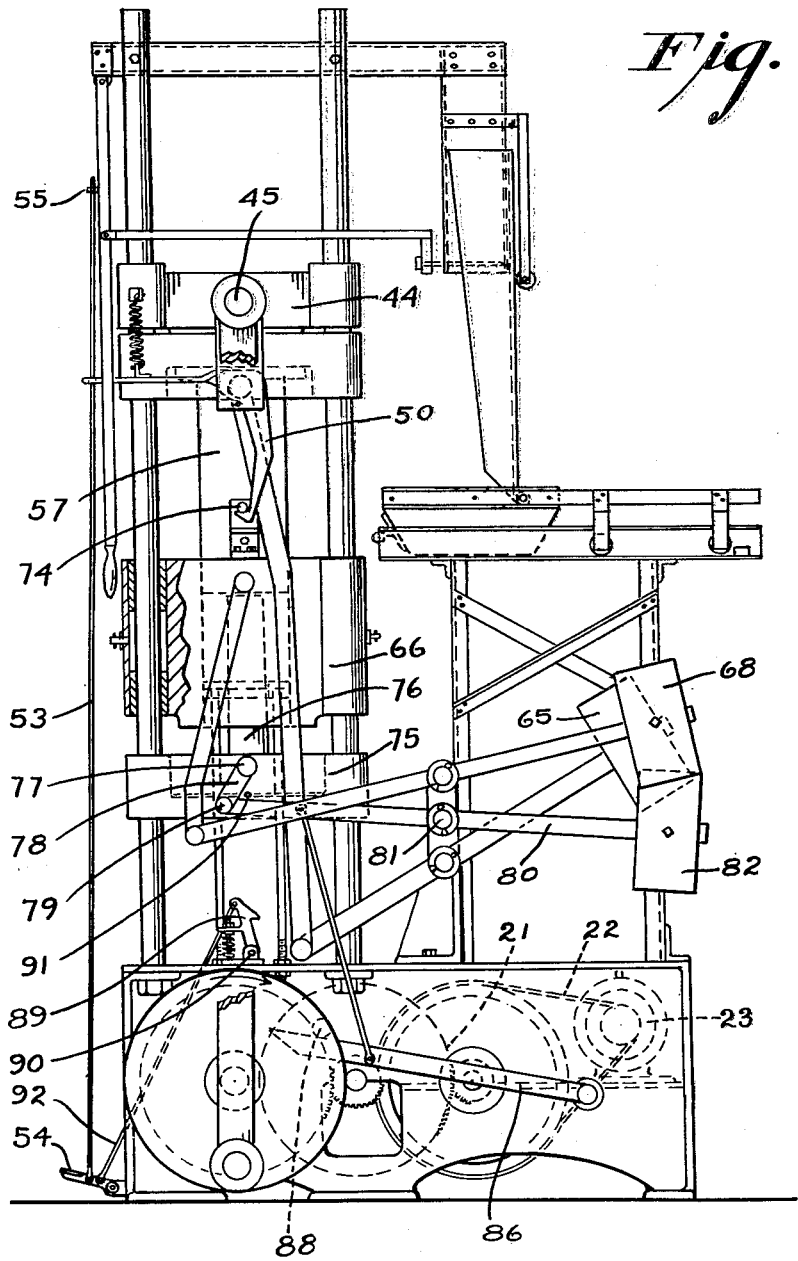
Fig. 3 is a view similar to Fig. 2 showing the press in pressing position.

In operation the press as shown in Figs. 1, 2 and 3 is at rest with the press head 57 elevated and the mold box 66 and cores 76 in aggregate receiving position. At this stage the hopper 33 is drawn forward into the position shown in dotted lines in Fig. 2, thus carrying the boot 31 into such position that aggregate issuing from the mouth of the chute 27 will be directed into the hopper and thence into the mold box. A pallet 43 having previously been placed in the mold box 66, and resting upon the plate 41, the lever 38 is drawn forward thus withdrawing the fingers 35 from their position closing the lower end of the chute 27 so that aggregate is permitted to flow down the boot 31 into the hopper 33 and thence into the mold box 66 around the cores 76. The mold box having been filled, the fingers 35 are returned to their chute closing position and the hopper is pushed back into the full line position shown in Fig. 2. The clutch mechanism 20 is then tripped and power is thereby transmitted to the drive shaft 17, thus causing the disks 18 to revolve so as to exert pull on the links 46 and cause the power head 44 to descend. The downward movement of the power head 44 causes the press head 57 to move downwardly as shown in Fig. 3 so as to compress the aggregate contained within the mold box 66 between the press head and pallet 43. Simultaneously with the downward movement of the power head 44 and press head 57, the arms 47 are lowered so as to remove the set screws 49 from supporting position beneath the flanges 73 and thus permit the mold box 66 to freely float under the pressure exerted upon the aggregate contained therein. In this manner the effect of a double ended pressing operation is produced upon the aggregate and a uniform packing of the particles thereof within the mold box 66 and about the cores is attained. As shown in Fig. 3, the press head 57 enters the mold box 66 for an appreciable distance and depresses the cores 76. This action further improves the packing of the aggregate about the cores. When the press head 57 reaches its lowermost position, the hook 50 engages the pin 74 carried by the mold box 66 so that when the power head 44 returns to its elevated position the mold box will be moved upwardly into the position shown in Fig. 5. At the instant that the press head 57 reaches its downward limit of movement and the hook 50 engages the pin 74, the lug 88 carried by the disk 18 engages the free end of the lever 86. Continued rotation of the disk not only causes the power head 44 to move upwardly taking the mold box 66 with it but through the engagement of the lug 88 with the lever 86 the latter is caused to exert pull on the link 84 and thus cause the core bridge 75 and the cores 76 to move downwardly into the position shown in Fig. 5, in which position they are held by the engagement of the lug 91 by the latch 89. In this position the press remains locked so that the pallet 43 and the completely finished block A can be removed and set aside to dry and season. In order to restore the press again to block making position, it is only necessary to press downwardly upon the treadle 54 which motion exerts pull on the tie rods 53 and 92 thus swinging the hook 50 about its pivot and disengaging it from the pin 74. This permits the mold box 66 which slightly overbalances the counterweight 68 to float gently downwardly until its downward movement is arrested by engagement of the flanges 73 with the set screws 49. Immediately after the release of the mold box 66 from its connection with the power head 44, the latch 89 is disengaged from the lug 91 and by reason of the counterweight 82 slightly overbalancing the weight of the core bridge 75 and cores 76, the latter will move upwardly until the adjustable stop pins 93 engage the under side of the mold box 66 in which position the upper ends of the cores 76 will be in a plane with the upper face of the mold box 66. When the parts have thus been restored to the positions just described, i. e., that shown in Figs. 1 and 2, the press is again ready to receive the aggregate and repeat the pressing operation.

While in the foregoing there has been shown and described the preferred embodiment of this invention, it is to be understood that minor changes in the details of construction, combination, and arrangement of parts may be resorted to without departing from the spirit and scope of the invention as claimed.

What is claimed is:

1. In a block press, a yieldingly supported mold box having an opening for the reception of aggregate, a pallet supported within the opening near one end thereof independently of the mold box, a press-head, means to advance the press-head toward the pallet support and cause it to enter the opening at the end opposite the pallet support, yieldingly supported cores within the mold box, said cores being yieldingly supported independently of said mold box, means to withdraw the cores from within the mold box and releasable means to lock the cores in withdrawn position.

2. In a block press, a yieldingly supported mold box having an opening for the reception of aggregate, a pallet supported within the opening near one end thereof independently of the mold box, a press-head, means to advance the press-head toward the pallet support and cause it to enter the opening at the end opposite the pallet support, means carried by the press-head to elevate the mold box upon the return of the press-head to its elevated position, releasable means to lock the mold box in its uppermost position, cores within and yieldingly supported independently of the mold box, means to withdraw the cores from the mold box as the latter is being elevated, releasable means to lock the cores in withdrawn position and means for progressively and sequentially releasing the mold box locking means and the core locking means.

3. In a block press, a yieldingly supported mold box having an opening for the reception of aggregate, a pallet support within the mold box near one end of the opening, a press-head, means to advance the press-head toward the pallet support and cause it to enter the opening at the end opposite the pallet support and means carried by the press-head advancing means to limit the downward movement of the mold box when the press-head is elevated.

4. In a block press, a yieldingly supported mold box having an opening for the reception of aggregate, a pallet support within the mold box near one end of the opening, a press-head, means to advance the press-head toward the pallet support and cause it to enter the opening at the end opposite the pallet support and adjustable brackets carried by the press-head advancing means to limit the downward movement of the mold box when the press-head is elevated.

5. In a block press the combination with a rigid pallet support and a press-head adapted to be advanced toward the pallet support to compress aggregate, of a mold box surrounding the pallet support, said mold box being yieldingly supported to move under the influence of the pressure exerted on it by the aggregate as the latter is being compressed between the pallet support and press-head, and cores within the mold box mounted to yield with the advance of the press-head into the mold box toward the pallet support.

6. In a block press the combination with a rigid pallet support and a press-head adapted to be advanced toward the pallet support to compress aggregate, of a mold box surrounding the pallet support, said mold box being yieldingly supported to move under the influence of the pressure exerted on it by the aggregate as the latter is being compressed between the pallet support and the press-head, cores within the mold box mounted to yield with the advance of the press-head into the mold box toward the pallet support and means operable in advance of the retraction of the press-head to withdraw the cores from within the compressed aggregate.

7. In a block press the combination with a rigid pallet support and a press-head adapted to be advanced toward the pallet support to compress aggregate, of a mold box surrounding the pallet support, said mold box being yieldingly supported tó move under the influence of the pressure exerted on it by the aggregate as the latter is being compressed between the pallet support and the press-head, cores within the mold box mounted to yield with the advance of the press-head toward the pallet support and means to withdraw the mold box from its position around the pallet support and compressed aggregate simultaneously with the return of the plunger to its retracted position.

8. In a block press the combination with a rigid pallet support and a press-head adapted to be advanced toward the pallet support to compress aggregate, of a mold box surrounding the pallet support, said mold box being yieldingly supported to move under the influence of the pressure exerted on it by the aggregate as the latter is being compressed between the pallet support and press-head, cores within the mold box mounted to yield with the advance of the press-head toward the pallet support, means to withdraw the mold box from its position around the pallet support and compressed aggregate upon the return of the press-head to its retracted position, and means operable in advance of the retraction of the press-head to withdraw the cores from within the compressed aggregate.

9. In a block press the combination with a rigid pallet support and a press-head adapted to be advanced toward the pallet support to compress aggregate, of a mold box surrounding the pallet support, said mold box being yieldingly supported to move under the influence of the pressure exerted on it by the aggregate as the latter is being compressed between the pallet support and press-head, cores within the mold box mounted to yield with the advance of the press-head toward the pallet support, means to withdraw the mold box from its position around the pallet support and compressed aggregate upon the return of the press-head to its retracted position, means operable in advance of the retraction of the press-head to withdraw the cores from within the compressed aggregate and releasable means to lock the mold box and cores in their withdrawn position.

10. In a block press the combination with a rigid pallet support and a press-head adapted to be advanced toward the pallet support to compress aggregate, of a mold box surrounding the pallet support, said mold box being yieldingly supported to move under the influence of the pressure exerted on it by the aggregate as the latter is being compressed between the pallet support and the press-head, cores within the mold box mounted to yield with the advance of the press-head toward the pallet support, means to withdraw the mold box from its position around the pallet support and compressed aggregate upon the return of the press-head to its retracted position, means operable in advance of the retraction of the press-head to withdraw the cores from within the compressed aggregate, releasable means to lock the mold box and the cores in withdrawn position and means for progressively and sequentially releasing the mold box and core locking means.

11. In a block press the combination with a rigid pallet support, a press-head adapted to be advanced toward the pallet support to compress aggregate and a press-head advancing means adapted to positively move the press-head only when advancing it toward the pallet support, of a mold box surrounding the pallet support, said mold box being yieldingly supported to move under the influence of the pressure exerted on it by the aggregate as the latter is being compressed between the pallet support and press-head, and adjustable brackets carried by the press-head advancing means to limit the movement of the mold box toward the pallet support when the press-head is in retracted position.

12. In a block press the combination with a rigid pallet support, a press-head mounted for movement toward and away from the support, positive means for moving the press-head only in a direction toward the support and separate means for retracting the press-head away from the support, a mold box surrounding the pallet support and adapted to contain aggregate, said mold box being yieldingly supported to move under the influence of the pressure exerted on it by the aggregate as the latter is being compressed between the pallet support and the press-head, and means carried by said positive means to limit the movement of the mold box toward the pallet support when the press-head is in retracted position.

GEORGE J. ROOT.
ARTHUR H. McCALL.